United States Patent
Herzog

(10) Patent No.: US 7,261,550 B2
(45) Date of Patent: Aug. 28, 2007

(54) METALLIC WORKPIECE FOR USE IN AN INJECTION MOLD

(75) Inventor: Frank Herzog, Lichtenfels (DE)

(73) Assignee: CL Schutzrechtsverwaltung GmbH, Lichtenfels (DE)

(*) Notice: Subject to any disclaimer, the term of this patent is extended or adjusted under 35 U.S.C. 154(b) by 37 days.

(21) Appl. No.: 11/028,428

(22) Filed: Jan. 3, 2005

(65) Prior Publication Data

US 2005/0112230 A1      May 26, 2005

Related U.S. Application Data

(63) Continuation of application No. PCT/DE03/02206, filed on Jul. 2, 2003.

(30) Foreign Application Priority Data

Jul. 3, 2002     (DE) .............................. 102 29 952

(51) Int. Cl.
*B29C 45/73* (2006.01)

(52) U.S. Cl. ...................... 425/547; 425/548; 425/552

(58) Field of Classification Search ................ 425/547, 425/548, 552
See application file for complete search history.

(56) References Cited

U.S. PATENT DOCUMENTS

| 5,753,274 A | 5/1998 | Wilkening et al. |
| 5,792,492 A * | 8/1998 | Takahashi ................... 425/552 |
| 2002/0020164 A1 | 2/2002 | Cleveland et al. |

FOREIGN PATENT DOCUMENTS

| DE | 195 11 772 A1 | 10/1996 |
| DE | 199 25 541 C1 | 12/2000 |

* cited by examiner

*Primary Examiner*—Tim Heitbrink
(74) *Attorney, Agent, or Firm*—Laurence A. Greenberg; Werner H. Stemer; Ralph E. Locher

(57) ABSTRACT

A metal workpiece is formed of a pre-manufactured lower part and an upper piece which is placed thereon using a metal powder sintering process, preferably laser sintering. The lower part is a partial workpiece which is made of a solid piece of metal shaped by machining, forming a ready-to-use workpiece in conjunction with the upper part.

13 Claims, 1 Drawing Sheet

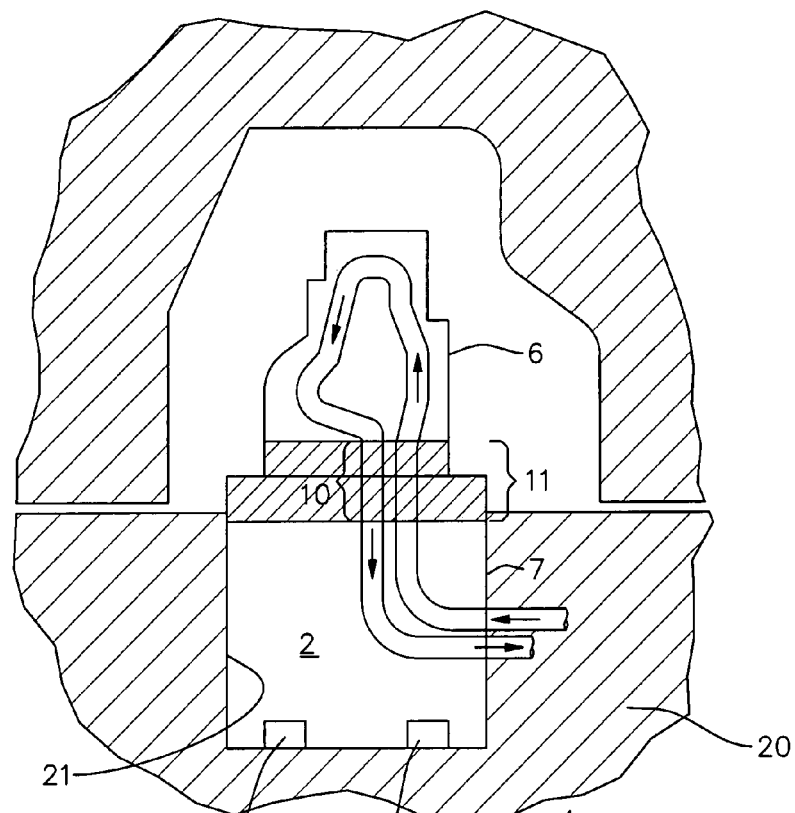
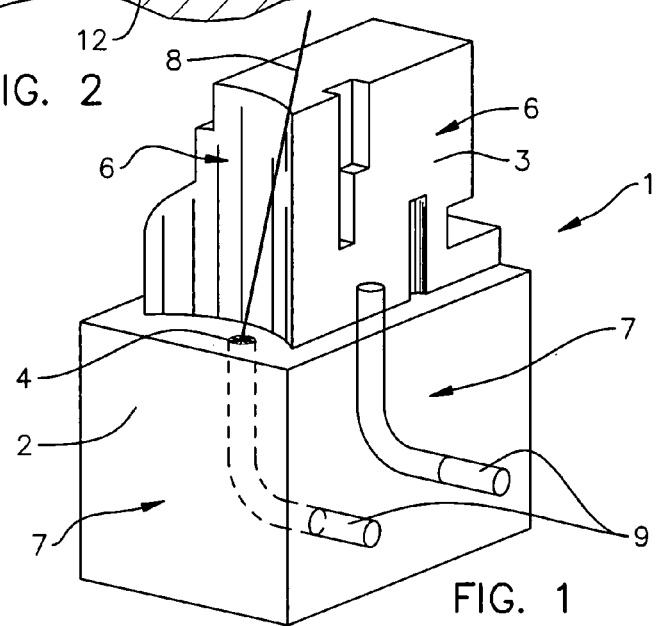

METALLIC WORKPIECE FOR USE IN AN INJECTION MOLD

CROSS-REFERENCE TO RELATED APPLICATION

This application is a continuing application, under 35 U.S.C. § 120, of copending international application No. PCT/DE2003/002206, filed Jul. 2, 2003, which designated the United States; this application also claims the priority, under 35 U.S.C. § 119, of German patent application No. 102 29 952.8, filed Jul. 3, 2002; the prior applications are herewith incorporated by reference in their entirety.

BACKGROUND OF THE INVENTION

FIELD OF THE INVENTION

It is known from German Patent DE 195 11 772 C2 (corresponding to U.S. Pat. No. 5,753,274) to produce a metallic work piece from a prefabricated bottom part and a top part applied to it by a metal powder sintering process. The bottom part is a pre-sintered plate that is formed from a material to which the build-up material bonds during the consolidation.

To allow the three-dimensional object produced in the known process to be used, it is necessary for the prefabricated base to be detached from the sintered-on object, since the prefabricated base serves only to shorten the production time of the three-dimensional object in the apparatus.

To enable the object to be used, the prefabricated base is detached from the actual object.

SUMMARY OF THE INVENTION

It is accordingly an object of the invention to provide a metallic workpiece and a process for producing the work piece which overcome the above-mentioned disadvantages of the prior art devices and methods of this general type.

With the foregoing and other objects in view there is provided, in accordance with the invention, a metallic workpiece. The workpiece contains a prefabricated bottom part having a surface and a top part applied to the prefabricated bottom part by a process being either a metal powder sintering process or a metal powder melting process resulting in a sintered structure or a melted structure. The prefabricated bottom part is a shaped partial workpiece produced from a solid piece of metal by metal-removing machining, metal eroding machining, laser removal of material, or by casting, and together with the top part forming the metallic workpiece ready for use. The prefabricated bottom part has at least one cooling passage. The cooling passage opens out into that part of the surface of the prefabricated bottom part adjoining the top part and continues in the top part.

The invention is based on the object of providing the metallic workpiece formed of the prefabricated bottom part and a top part applied to it by a metal powder sintering/melting process, which can be used immediately after removal from the building space of the sintering apparatus and in which the materials properties of the top part and bottom part can be selected freely with a view to the requirements imposed on the workpiece.

One core part of the invention is the provision of a shaped bottom partial workpiece which has been produced from a solid piece of metal by metal-removing or similar machining, and of building up the top part on the bottom part by a metal powder sintering or melting process. The finished workpiece is then available immediately after the sintering/melting process.

Workpieces of this type are suitable in particular as injection mold inserts that can be inserted into a standard mold. The bottom parts of molds of this type are generally standardized and have relatively simple, generally cylindrical or cubic shapes or shape portions. They can therefore be readily produced from a solid metal block by metal-removing or similar machining, with the associated advantage that block-like bottom parts of this type have high strengths. By contrast, the top parts of injection mold inserts are often of a finely structured configuration. Moreover, they have to be provided with complicated cooling passages which run in the interior of the top part, often all the way into workpiece regions which taper to a point. The metal powder sintering process, which is now particularly advantageously combined for the first time with a prefabricated partial workpiece, namely the block-like bottom part, is suitable for producing workpiece portions of this type. The overall advantage achieved therefore resides not only in a shortened building time but also in the possibility of adapting the properties of individual workpiece portions to the particular demands imposed. High forces have to be absorbed in the region of the workpiece bottom part. This is achieved particularly successfully using solid parts milled out of solid material. Finely configured top parts with complex cooling passages can be produced with different strengths but also, for example, with improved thermal conductivity properties.

The bottom part may be provided with a carrier layer on to which the top part can be sintered. The carrier layer can be formed from the same metallic material(s) as those that are present in the top part, resulting in particularly intimate bonding between the top part and the bottom part.

It is possible for both the surfaces of the workpiece top part and the surfaces of the prefabricated workpiece bottom part to be reworked by removal of material or remelting using a laser beam during or after the sintering process. That surface of the bottom part which adjoins the top part can be more or less completely melted as well during the sintering of the first powder layer, so that this measure likewise makes it possible to achieve particularly intimate bonding between the top part and the bottom part.

It is advantageous if the bottom part has cooling passages introduced by material-removing machining. These passages are relatively quick to introduce and may have a relatively simple profile in the bottom part. The cooling passages continue in the sintered structure of the top part, into which the cooling passages are sintered. In the transition region, it is possible for the passage walls to be (partially) melted prior to the building operation by the sintering laser both in the region of the top part and in the region of the bottom part. The same also applies to outer contours in the transition region between the top part and the bottom part. This results in an outer region that supports the transition region, thereby further improving the bond between the top part and the bottom part.

A process for producing a metallic workpiece having a prefabricated bottom part and a top part which is built up on the bottom part by a metal powder sintering process is characterized by a sequence of process steps which is now described.

First, the bottom part of the metallic workpiece is produced by material-removing or similar machining from a solid block of metal, the machining substantially being finish machining, i.e. the basic shape of the bottom part is, for example, milled, with cooling passages, recesses, holding device and the like, as well as recesses for a clamping-bolt-centering device, being provided. The substantially finished bottom part is then inserted into the building chamber of a laser sintering machine, where it is reproducibly positioned, for example by a clamping-bolt-centering device or a probe system, which is provided in the laser sintering device and which engages by clamping bolts in recesses in the prepared bottom part. Then, the upwardly facing regions of the bottom part are coated with laser sintering material, and then a sintering operation is carried out, so as to consolidate the sintering material and, at the same time, to complete bonding to the upwardly facing surface of the bottom part.

In a further refinement of the process, it is possible to provide for the upwardly facing surface of the bottom part, covered with the laser sintering material, to be at least partially melted when the consolidation of the laser sintering material is being carried out. As a result, a particularly strong intermediate layer is formed. Furthermore, it is possible for the edges of the workpiece top part and/or of the workpiece bottom part and also if appropriate the outer surfaces thereof to be remelted again by a laser sintering beam during the laser sintering operation. Of course, this can also take place after the actual building operation has ended, in particular with regard to the outer surfaces.

It is also possible to carry out precision removal of material from the edges and surfaces of the top part by, as it were, using the laser beam to "smooth over" the surfaces and edges of the workpiece again.

Other features which are considered as characteristic for the invention are set forth in the appended claims.

Although the invention is illustrated and described herein as embodied in a metallic workpiece and a process for producing the work piece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a workpiece according to the invention; and FIG. 2 is a section view of the workpiece in the form of a mold insert that has been inserted into a standard injection mold.

DESCRIPTION OF THE PREFERRED EMBODIMENTS

Referring now to the figures of the drawing in detail and first, particularly, to FIG. 1 thereof, there is shown a workpiece 1 formed of a prefabricated bottom part 2 and a top part 3 applied to it by a metal powder sintering process. A carrier layer 4, which may either have a different metallic composition than the bottom part 2 or may have a different structure, since the carrier layer 4 can be produced, for example, by complete melting of the surface of the bottom part, is provided between the top part 3 and the bottom part 2. Both the surfaces 6 of the top part 3 and the surfaces 7 of the bottom part 2 may be remelted by a laser beam 8 of the laser sintering installation.

The thermal conductivity of the material of the top part 3 is higher than that of the bottom part 2, but the mechanical load-bearing capacity of the bottom part 2 is higher than that of the top part 3. However, it is also possible for the top part 3 and the bottom part 2 to be produced from the same material with virtually identical properties.

Cooling (liquid) passages 9, which open out into that surface of the bottom part 2 which adjoins the top part 3 and continue in the sintered structure of the top part 3, have been introduced in the bottom part 2 by material-removing machining.

Both transition regions 10 of the cooling passage walls and transition regions 11 of the outer surfaces 6, 7 may be remelted in order to achieve an intimate bonding and harder structure of the respective regions of material.

Furthermore, recesses 12 for receiving a clamping-bolt-centering device are provided at the underside of the bottom part 2.

The workpiece 1 illustrated in the drawings in FIGS. 1 and 2 is a mold insert that can be inserted into a recess 21 in a standard injection mold 20, where it is held by its bottom part 2. However, other application areas for the workpiece 1 are also conceivable, for example as a prototype pattern, in which case the bottom part 2 can then serve as a shaped base, as a pressing or printing tool and the like.

The invention has been described above on the basis of a mold insert as an exemplary embodiment. However, it is also possible, for example, to produce functional parts containing a bottom part and a melted-on top part in the same way in accordance with the invention.

I claim:

1. A metallic workpiece, comprising:
   a prefabricated bottom part having a surface; and
   a top part applied to said prefabricated bottom part by a process selected from the group consisting of a metal powder sintering process and a metal powder-melting process resulting in a structure selected from the group consisting of sintered structures and melted structures;
   said prefabricated bottom part being a shaped partial workpiece produced from a solid piece of metal by metal-removing machining, metal eroding machining, laser removal of material, or by casting, and together with said top part forming the metallic workpiece ready for use;
   said prefabricated bottom part having at least one cooling passage formed therein, said cooling passage opening out into that part of said surface of said prefabricated bottom part adjoining said top part and continuing in said top part.

2. The workpiece according to claim 1, wherein said prefabricated bottom part and said top part are formed of the same metallic elements.

3. The workpiece according to claim 1, wherein said prefabricated bottom part has a carrier layer onto which said top part is sintered and/or melted.

4. The workpiece according to claim 3, wherein said carrier layer and said top part are formed of the same metallic elements.

5. The workpiece according to claim 1, wherein said top part has a top surface and both said top surface and said surface of said prefabricated bottom part are reworked, by removal of material using a laser beam.

6. The workpiece according to claim 1, wherein a thermal conductivity of a material of said structure forming said top part is higher than that of said prefabricated bottom part.

7. The workpiece according to claim 1, wherein a mechanical load-bearing capacity of a material of said prefabricated bottom part is higher than that of said top part.

8. The workpiece according to claim 1, wherein:
said top part has an outer side with contours; and
said cooling passage is one of a plurality of cooling passages having inner walls, said contours and said inner walls being one of completely melted and during a building operation an entire layer to be exposed is completely remelted.

9. The workpiece according to claim 1, wherein a part of said surface of said prefabricated bottom part adjoining said top part contains at least one intermediate layer which is completely melted by a sintering laser.

10. The workpiece according to claim 1, wherein said prefabricated bottom part has at least one recess formed therein for receiving a clamping-bolt-centering device.

11. The workpiece according to claim 1, wherein the workpiece is a mold insert which can be inserted into a standard injection mold, and is held in the standard injection mold by a region of said prefabricated bottom part.

12. The workpiece according to claim 1, wherein said cooling passage is formed by a metal-removing machining process.

13. The workpiece according to claim 5, wherein said top surface and said surface are reworked by remelting.

* * * * *